United States Patent [19]

Reidinger

[11] Patent Number: 5,040,320
[45] Date of Patent: Aug. 20, 1991

[54] ILLUMINATED INFORMATION DISPLAY ASSEMBLY

[75] Inventor: Michael J. Reidinger, Vanport, Pa.

[73] Assignee: Tru-Lyte Systems, Incorporated, Beaver, Pa.

[21] Appl. No.: 828,200

[22] Filed: Feb. 10, 1986

Related U.S. Application Data

[63] Continuation-in-part of Ser. No. 538,797, Oct. 4, 1983, Pat. No. 4,569,571.

[51] Int. Cl.$^5$ .......................................... G09F 13/04
[52] U.S. Cl. ...................................... 40/570; 40/547; 362/32
[58] Field of Search ................. 40/546, 547, 550, 551, 40/552, 573, 578, 570; 362/32, 810, 811, 812; 350/96.1, 96.24, 96.25, 96.27

[56] References Cited

U.S. PATENT DOCUMENTS

| | | | |
|---|---|---|---|
| 585,451 | 6/1897 | Schneider | 362/32 |
| 2,080,259 | 5/1937 | Frei | 362/32 |
| 2,639,528 | 5/1953 | Ochsner | 40/547 |
| 3,184,872 | 5/1965 | Way | 40/547 |
| 4,236,191 | 11/1980 | Martinez | 362/32 |
| 4,279,089 | 7/1981 | Murakami | 40/547 |
| 4,296,562 | 10/1981 | Sanborn | 40/547 X |
| 4,310,974 | 1/1982 | Gdovin | 40/547 X |
| 4,417,412 | 11/1983 | Samsom | 40/547 |
| 4,738,510 | 4/1988 | Sansom | 40/547 X |

FOREIGN PATENT DOCUMENTS

| | | | |
|---|---|---|---|
| 571836 | 5/1924 | France | 40/550 |
| 2501882 | 9/1982 | France | 40/547 |
| 0018560 | 7/1979 | Japan | 40/547 |

OTHER PUBLICATIONS

Kirk-Othmer, Encyclopedia of Chemical Technology, Third Ed., vol. 10 (New York, John Wiley & Sons, 1980), pp. 126, 143, 144.

Kirk-Othmer, Encyclopedia of Chemical Technology, Third Ed., vol. 14 (New York, John Wiley & Sons, 1980), pp. 58, 279, 284, 285.

*Primary Examiner*—Kenneth J. Dorner
*Assistant Examiner*—J. Hakomaki
*Attorney, Agent, or Firm*—Louis E. Marn

[57] ABSTRACT

An illuminated display which utilizes optical fibers to convey visible light from a singular light source to a display board. The display board is provided with channels (apertures) into which ends of optical fibers are inserted and secured. The placement of optical fibers at regular intervals around the perimeter of an alphabetical character and an irregular, random locations within the area defined by the perimeter produces a display with enhanced visual effects, greater reliability, and lower operating costs than conventional illuminated displays.

1 Claim, 1 Drawing Sheet

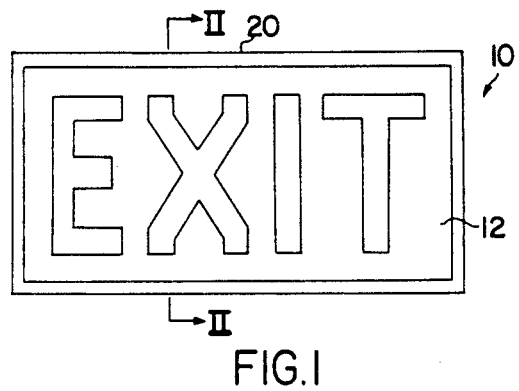
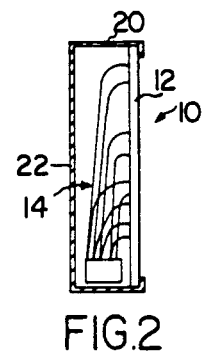
FIG.1  FIG.2
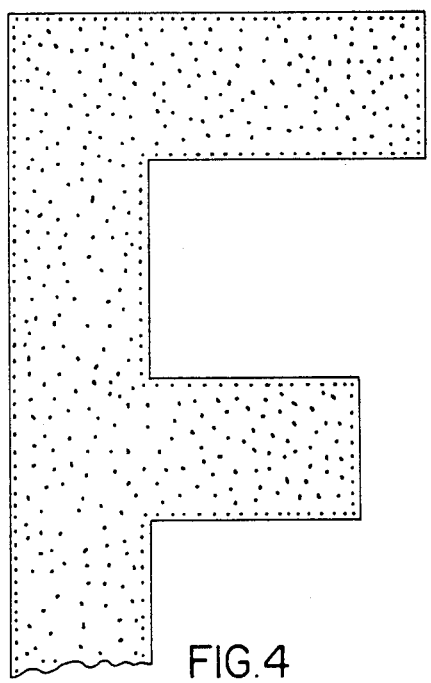
FIG.4
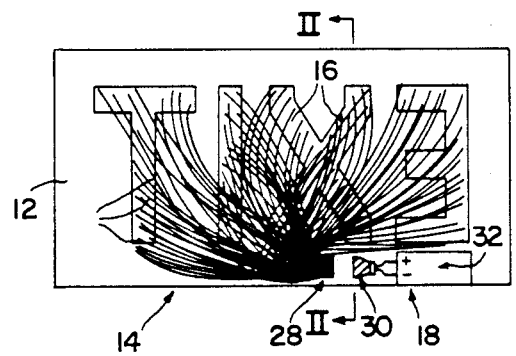
FIG.3
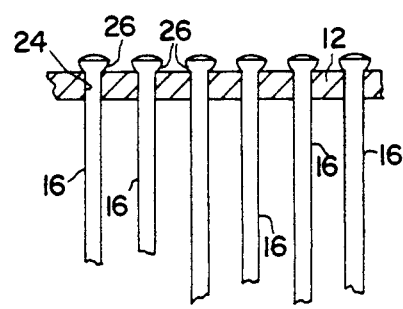
FIG.5

ILLUMINATED INFORMATION DISPLAY ASSEMBLY

BACKGROUND OF THE INVENTION (1) Related Applications

This is a continuation-in-part application of U.S. application Ser. No. 06/538,797, filed Oct. 4, 1983, now U.S. Pat. No. 4,569,571.

(2) Field of the Invention

This invention relates to a light emitting information display assembly, and more particularly to an emergency illumination display assembly.

(3) Description of the Product

All public and military structures such as hospitals, schools, warehouses and ships are required to have illuminated signs indicating emergency evacuation routes. Certain standards exist pertaining to visibility, light intensity, lettering size, wording, and fail-safe operation. The National Electrical Code requires that emergency lighting systems be designed and installed so that the burning out of any individual lighting element cannot leave any space in total darkness, and that two or more separate and complete systems with independent power supply, each providing sufficient current for emergency lighting purposes, be supplied.

Some fire codes require that the backup system remain visibly illuminated for a period of up to ninety minutes after a power failure to facilitate evacuation of the premises. The Occupational Safety and Health Administration (OSHA) further requires that any sign designating an emergency egress be designed so that the word "EXIT" is depicted in block lettering, at least six inches high. The strokes of these letters must be ¾ of an inch in width.

Further, the exit indicator must produce a light output of at least five lux, and be mounted in such a way and location as to afford maximum visibility, and cause minimum confusion during an emergency. Most fire codes also require that these indicators be lit continuously during occupancy.

Most signs of the existing type are illuminated by a pair of twenty watt incadescent lamps. Some contain an additional lamp for backup. Many buildings, structures, and ships have numerous exits, and a single multi-floor structure can contain literally hundreds of exit signs, expensive to install, and consuming thousands of kilowatts of electricity per year to operate and dozens of man hours per year to maintain.

In addition, the heat generated (almost useless during heating season due to conduction through walls and ceilings) must be removed during the air conditioning season. Moreover, at least one or more of the light bulbs can be expected to burn out per year of continuous illumination. With hundreds of these units installed in a structure or vessel, the cost of replacing these bulbs can become quite high. The light bulbs themselves are relatively expensive, as is the cost of the labor involved. It has been estimated by those experienced in the art that each emergency exit sign costs between $70 and $120 per year to operate and maintain.

Few inventions of the prior art can meet all or any specification of the various codes and laws. Fewer still can be retro-fitted to meet these requirements at all. Those that can, can be done so only with a labor and materials cost that rivals or exceeds the cost of the original device.

Of the devices that do meet most regulations, some require their auxiliary backup power from the mains as well, rendering them powerless in the face of an overall power outage.

In those that have a battery powered backup system, the battery pack (necessarily large and heavy) powers one or more incandescent low wattage lamps. These lack both sufficient intensity and/or burn time to be useful during a low visibility emergency such as a smoky fire.

A few types have other light sources such as fluorescent tubes or other types of electro-luminescent panels. The initial cost of these units can be prohibitive. The electrical requirements are much more complicated and maintenance costs are higher. Although another model claims to be explosion proof, when displayed in a hazardous location as defined by National Electrical Codes, it is supplied by mains current and in certain situations it can become hazardous, and is therefore, at least, only explosion resistant.

OBJECTS OF INVENTION

An object of the present invention is to provide a novel light transmitting information display assembly.

Another object of the present invention is to provide a novel light transmitting information display assembly of improved visual effects.

Yet another object of the present invention is to provide a novel light transmitting information display assembly of greater reliability.

Still another object of the present invention is to provide a novel light transmitting information display assembly of reduced operational costs.

A still further object of the present invention is to provide a novel light transmitting emergency display assembly exhibiting enhanced visual effects under adverse conditions.

A further object of the present invention is to provide a novel light transmitting information display having a reduced number of sources of electromagnetic radiation in the visible spectrum.

SUMMARY OF THE INVENTION

The objects of the present invention are achieved by a light transmitting display assembly comprised of a display board containing information and having ends of optical fibers of an optical fiber bundle selectively positioned therein and by a source of electromagnetic radiation in the visible spectrum whereby such source is directed into the other ends of the optical fibers of the optical fiber bundle.

BRIEF DESCRIPTION OF THE DRAWINGS

These and other objects of the present invention will be readily appreciated by reference to the following detailed description when taken with the accompanying drawings wherein like numerals designate like parts throughout, and wherein:

FIG. 1 is an elevational view of an information display assembly of the present invention;

FIG. 2 is a schematic cross-sectional side view thereof taken along the lines II—II of FIG. 1;

FIG. 3 is a rear view, somewhat schematic of a display board of the information display assembly of FIG. 1;

FIG. 4 is a partial enlarged view of a letter of a word of the information display assembly; and FIG. 5 is an enlarged partial view of end of optical fibers mounted in the display board.

DETAILED DESCRIPTION OF THE INVENTION

Referring now to the drawings, and particularly to FIGS. 1 to 3, there is illustrated a light transmitting display assembly, generally indicated as 10, comprised of an information containing display board or substrate 12, an optical fiber bundle, generally indicated as 14, comprised of a plurality of optical fibers 16 and an assembly including a source of electromagnetic radiation in the visible spectrum, generally indicated as 18 positioned in a housing 20 including a back wall 22.

The display board 12 may be formed of any material, however, is preferably formed by injection molding techniques from a thermoplastic resin, e.g. polystyrene or the like, together with a plurality of channels or orifices 24, referring specifically to FIG. 5, of a diameter from 100 μm to 1.27 cm in a predetermined array. The illustrated embodiment of the present invention is specific to an emergency "exit" sign with the word "EXIT" spelled in capital letters, such as hereinabove specified with respect to OSHA requirements. Each letter is formed with straight line portions thereof with a row of aligned channels 24 parallel thereto with a spacing of from 0.5 to 10 mm between channels along an inner periphery of each letter, referring to FIG. 4. Within the area delineated by the row of aligned channels 24 forming an outline of each letter, there is formed a plurality of channels 24 in essentially random array to provide body light to each of the letters constituting the information of the display board.

The optical fibers to be used in accordance with the present invention may be of like diameter to facilitate assembly of the display board 12. Generally monomode optical fibers are used of a diameter of from 100 μm to 1.27 cm inches with cladding of from 1 to 2 mm. Each optical fiber 16 is cut to a predetermined length and is heated to a temperature above its melting point at one end thereof for a time sufficient to form a bulbous or bell-shaped end 26 as illustrated in FIG. 5.

Each thus formed optical fiber 16 is coursed through each of the channels 24 formed in the display board 12 to a point where the bulbous end 26 of each optical fiber contacts the display board 12 in a manner to prevent further coursing of each of the optical fibers 16. Each optical fiber 16 is thereafter fixedly positioned within the display board, such as by a high temperature epoxy system, generally in the back side of the display board 12.

After all the optical fibers 16 are positioned in the display board, the optical fibers 16 are preferably gathered up and formed into a convenience bundle array 14 and the free ends of the optical fibers gathered and formed into a closely packed array and held in place by suitable means, for example bound into an epoxy resin. Once bound into such closely packed array, the thus bound end may be cut and polished to form a frame member 28, such as disclosed in the aforementioned co-pending application, referring to FIG. 3, and positioned proximate a source 30 of electromagnetic radiation in the visible spectrum including for example a high-intensity laser light emitting diode or a halogen bulb of the assembly 16. The source 30 may be connected to a power source, such as a battery 32 or as described in U.S. Pat. No. 4,201,005 to Hunt, incorporated herein by reference.

It will be appreciated by one skilled in the art that the light transmitted by the light source is passed via the optical fibers directly to the eye of the viewer, as distinguished via an intermediate surface of the display board. Additionally, while the present invention is described with reference to an emergency illumination assembly, the present invention may be used in visual display systems conveying information or data as well as pictorial representations. Still further, it will be understood that the free ends of the optical fibers 16 placed proximate to the source of electromagnetic radiation in the visible spectrum may be arranged in a manner other than the hereinabove disclosed close packed array. While a single source of electromagnetic radiation in the visible spectrum is disclosed, it will be understood that more than one source may be employed depending on, inter alia, size, desired distance of visibility and recognition, etc. as would be understood by one skilled in the art.

While the invention herein has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. An illuminated information display assembly, which comprises:
   a display board including information formed thereon;
   a plurality of channels in close array outlining alphabetical characters depicting "EXIT" formed in said display board;
   a source of illumination comprised of diode laser emitting light in wavelengths of from 610 to 660 nm.; and
   a plurality of optical fibers, each optical fiber having one end disposed in and fixed to a channel of said plurality of channels in said display board and the other end disposed proximate to said source of illumination, said ends of said optical fibers disposed in said channels being formed with an enlarged portion of a size larger than said channels, said ends of said optical fibers disposed proximate said source being formed into a bundle of closely packed optical fibers and forming a transversely oriented common plane with said ends of said optical fibers along said common plane being polished, an area defined by said channels being provided with channels formed in random array.

Reconsideration and allowance of this application are respectfully requested in view of the foregoing amendment to the claim and following remarks.

* * * * *